Patented Apr. 7, 1931

1,800,194

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

CONSTRUCTION MATERIAL

No Drawing.  Application filed July 30, 1925. Serial No. 47,162.

The present application contains subject matter withdrawn from my application Serial No. 437,621, filed January 15, 1921, now Patent No. 1,550,310, dated August 18, 1925.

This invention relates to the treatment of adhesive surfaces in products used in the construction field, and relates to a vehicle presenting an adhesive surface, said vehicle preferably being formed of bituminous or vegetable material either with or without fibrous matter pressed or rolled into sheets and having the surface thereof treated with a silicate of soda. This may be applied in the dry powdered form or by rolls coated with a silicate of soda or a silicate of soda and water mixture, and after being thus coated, allowed to dry.

It is readily understood that various consistencies of silicate of soda may be purchased in commercial form and may readily be thinned out by the mixture of water. The thinning out process will determine the thickness of the applied treatment except when applied in a powdered state, at which time the degree of powder placed on the sides will determine the proportion of silicate of soda used.

If it should be desired to allow the film to set hard and dry and the surface brought back to a wet condition, it would only be necessary to apply water as a solvent or allow the face of the vehicle to come in contact with a mass largely composed of water.

I claim:—

1. Construction material comprising a bituminous vehicle presenting an adhesive surface, said adhesive surface being protected by a covering of material soluble in water.

2. Construction material comprising a bituminous vehicle presenting an adhesive surface, said adhesive surface being protected by a film of silicate of soda.

3. A sheet of construction material having an adhesive surface protected by a coating of silicate of soda.

4. Construction material comprising a sheet of bituminous material having fibrous material incorporated therein, and an adhesive surface on said sheet protected by a coating of silicate of soda.

5. Construction material having an adhesive surface covered by a protective coating of silicate of soda.

In testimony whereof I have signed my name to this specification, on this 20th day of July, A. D., 1925.

ALBERT C. FISCHER.